United States Patent [19]

Detroit

[11] Patent Number: 5,446,133
[45] Date of Patent: Aug. 29, 1995

[54] NITRIC ACID OXIDIZED LIGNOSULFONATES

[75] Inventor: William J. Detroit, Schofield, Wis.

[73] Assignee: LignoTech USA, Inc., Rothschild, Wis.

[21] Appl. No.: 204,881

[22] Filed: Mar. 2, 1994

Related U.S. Application Data

[63] Continuation of Ser. No. 911,344, Jul. 8, 1992, abandoned, which is a continuation of Ser. No. 578,760, Sep. 6, 1990, abandoned.

[51] Int. Cl.6 ............................................. C07G 1/00
[52] U.S. Cl. .................................... 530/500; 530/501; 530/502; 530/505; 530/506; 530/507; 530/421
[58] Field of Search ............... 530/500, 501, 502, 505, 530/506, 507, 421

[56] References Cited

U.S. PATENT DOCUMENTS 3,070,591 12/1962 Hoyt .................................. 530/500
4,447,339 5/1984 Detroit ........................... 252/8.5 A
4,488,907 12/1984 Sarkkinen ........................ 530/500

OTHER PUBLICATIONS

A bulletin published by Daishowa Chemicals, Inc., "The Lignin Story".

*Primary Examiner*—Paul R. Michl
*Assistant Examiner*—Duc Truong
*Attorney, Agent, or Firm*—Andrus, Sceales, Starke & Sawall

[57] ABSTRACT

A process for producing an oxidized lignosulfonate composition comprising admixing a lignosulfonate and nitric acid such that the amount of acid comprises from about 35% to about 100% by weight of dry solids of the lignosulfonate, and reacting said mixture for a time sufficient to form the oxidized lignosulfonate composition.

15 Claims, 2 Drawing Sheets

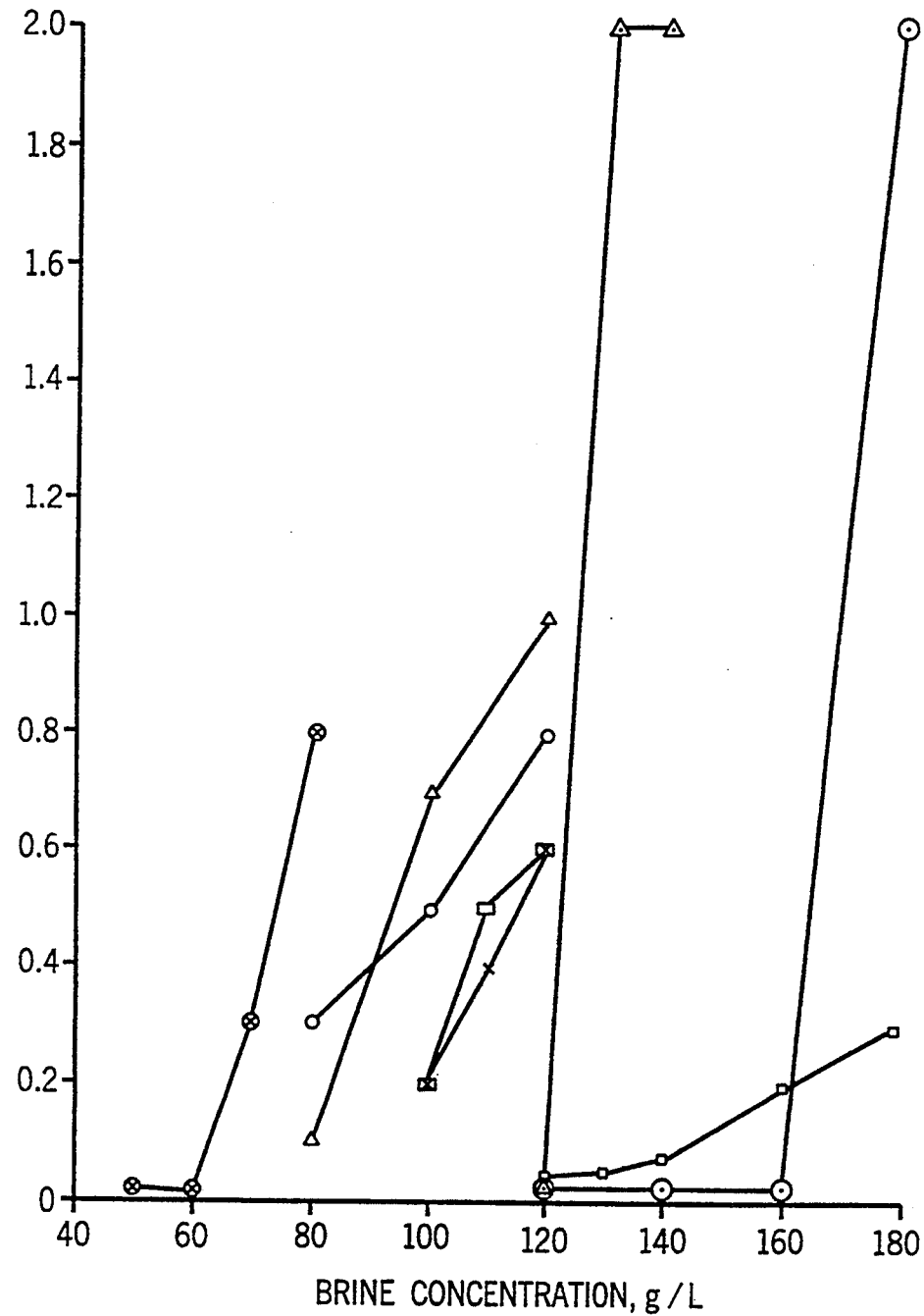

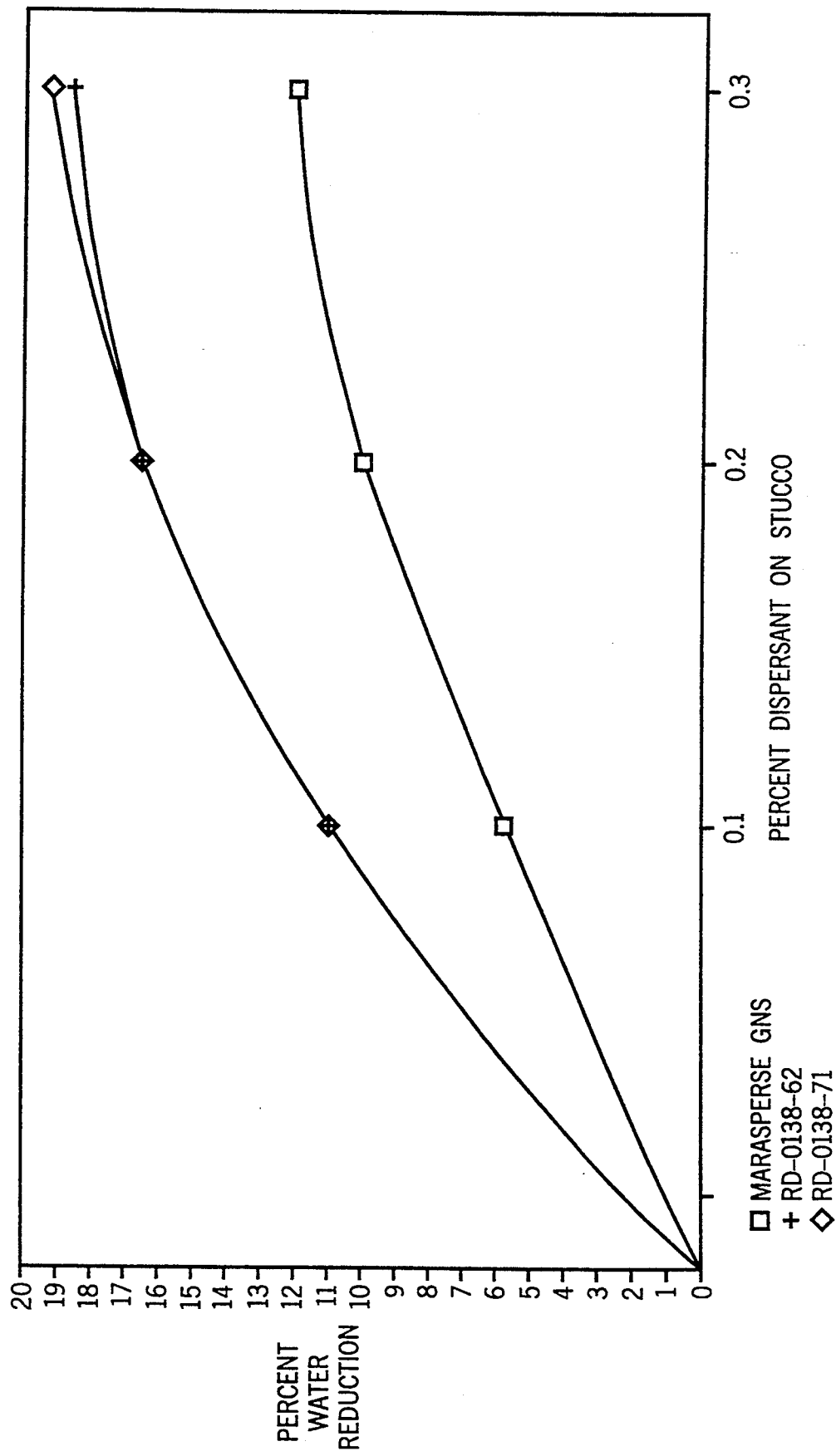

NITRIC ACID OXIDIZED LIGNOSULFONATES

This application is a continuation of application Ser. No. 07/911,344 filed Jul. 8, 1992, now abandoned which in turn is a continuation of application Ser. No. 07/578,760 filed Sep. 6, 1990, now abandoned.

BACKGROUND AND SUMMARY OF THE INVENTION

The present invention relates to a modified lignin material and to a process for producing said modified lignin material. More particularly, this invention relates to a nitric acid oxidized lignosulfonate composition and to a process for its preparation.

Various and numerous sulfonated and otherwise derived lignin materials have already been found, known and developed and advantageously applied for many useful and beneficial purposes.

Numerous references are available dealing in one way or another with the identity and nature of lignin per se and many of the derivatives of lignin, including lignosulfonates, as well as the preparation and numerous uses of such materials. Substantial information therein can be found by way of illustration in U.S. Pat. Nos. 1,848,292; 2,371,136; 2,371,137; 2,349,183; 2,505,304; 2,576,418; 2,598,311; 2,800,449; 3,087,923; 3,156,520; and 3,726,850. Still additional art of interest is uncovered in U.S. Pat. Nos. RE. 18,268; 2,057,117; 2,104,701; 2,399,607; 2,434,626; 4,181,652; 4,088,640; 4,846,871; 4,065,318; 4,293,459; RE.32,895; 4,752,317; 4,296,813; RE.31,190; and 4,219,471.

Another excellent information source in this area is the bulletin published by Daishowa Chemicals Inc. of Greenwich, Conn. (USA) and Quebec P.Q. (Canada) entitled, "The Lignin Story."

Hoyt U.S. Pat. No. 3,070,591 discloses a process for producing nitric acid oxidized lignosulfonates by admixing a sulfonated lignin material and nitric acid. However, the amount of the nitric acid used is disclosed as being only 1–30% by weight of dry solids of the sulfonated lignin material. As shown herein, an oxidized lignosulfonate produced by such a method is inferior to those produced using higher concentrations of nitric acid.

The lignosulfonates which are preferably utilized as the starting materials in the practice of and to obtain the novel nitric acid oxidized compositions of the present invention are the treated or untreated spent sulfite liquors containing the desired effluent lignosulfonate solids obtained from wood conversion as the sulfite waste pulping liquor. These, as indicated, may be nitric acid oxidized in the "as is" or whole liquor condition. Or and often times with advantage, they may be oxidized as a purified lignosulfonate material from, or in which the sugars and other saccharide constituents have been removed and/or destroyed, or additionally inorganic constituents have been partially or fully eliminated.

Also sulfonated or sulfoalkylated kraft lignin can be used as an adequate raw material for nitric acid oxidation. As used herein, the term "kraft lignin" has its normal connotation, and refers to the substance which is typically recovered from alkaline pulping black liquors such as are produced in the kraft, soda and other well known alkaline pulping operations. The term "sulfonated lignin", as used in the specification refers to the product which is obtained by the introduction of sulfonic acid groups into the kraft lignin molecule, as may be accomplished by reaction of the kraft lignin with sulfite or bisulfite compounds, so that kraft lignin is rendered soluble in water. As used herein, the term "sulfite lignin" refers to the reaction product of lignin which is inherently obtained during the sulfite pulping of wood, and is a principle constituent of spent sulfite liquor. The term "lignosulfonate" (LSO$_3$) encompasses not only the sulfite lignin, but also the sulfonated lignin herein above described. Any type of lignosulfonate that is hardwood, softwood, crude, or pure may be employed. Preferably, lignosulfonates in their as is or whole liquor condition are employed. For example calcium lignosulfonates, sodium lignosulfonates, ammonium lignosulfonates, modified lignosulfonates and mixtures or blends thereof may all be utilized herein. Lignosulfonates are available from numerous sources in either aqueous solution or dried powder forms. For example Daishowa Chemicals Inc. sells lignosulfonates under the trade designations Lignosol, Norlig, and Marasperse which are appropriate for use in the present invention.

In general, the lignosulfonates are anionic polyelectrolytes with a relative molecular size usually on the order of 1,000 to 20,000 and from which the oxidized products are obtained according to the instant invention. They generally have an organic sulfonic sulfur, that is—SO$_3$, content calculated as percent sulfur by weight of broadly between about ½ to about 15 percent. More advantageously for many purposes, this sulfur range is between about 1¾ to about ten percent. While quite often it is preferable for the lignosulfonate to contain from about two to eight weight percent of the combined sulfur which represents its appearance in the sulfonic form.

Many of the lignosulfonates that are advantageously nitric acid oxidized according to the practice of the present invention are obtained in waste pulping liquors derived from a totally or at least substantially hardwood source. However, excellent oxidized lignosulfonate products are also prepared from softwood starting materials.

Good examples of lignosulfonate products of various types which are commercially available from Daishowa Chemicals Inc. include those having the trade designations Norlig and Marasperse. These are generally derived from sulfite waste pulping liquors with Marasperse being considerably refined as to sugars and certain inorganics contents compared to Norlig. The Lignosol products, also available from Daishowa Chemicals Inc., are derived from substantially softwood sulfite waste pulping liquors and can be whole liquor "as is" raw materials or, depending on processing, can be modified or purified softwood lignosulfonates.

While the known lignosulfonate products, including the above mentioned Norlig, Lignosol and Marasperse materials are good surfactant, dispersant, detergent and otherwise attractively propertied materials that are commendable for a wide variety of uses, they still have certain intrinsic inadequacies and limitations leaving some unfulfilled capability for use in many additional applications and for many highly advantageous purposes.

SUMMARY AND OBJECTIVES OF THE INVENTION

This invention pertains to and resides in the general field of nitric acid oxidized lignosulfonate derivatives having greatly enhanced solubility, especially in saline divalent environments and also having greatly improved dispersant and surfactant properties. Amongst its principle aims and objectives are the provision of such nitric acid oxidized lignosulfonate products.

Accordingly, the present invention provides for a process for producing an oxidized lignosulfonate composition comprising admixing a lignosulfonate and nitric acid such that the amount of acid comprises from about 35% to about 100% by weight of dry solids of the lignosulfonate, and reacting said mixture for a time sufficient to form the oxidized lignosulfonate composition.

BRIEF DESCRIPTION OF THE DRAWINGS

FIG. 1 is a graph of salt tolerance data in diluted 220 g/l brine for five different oxidized lignosulfonates and three untreated lignosulfonates; and FIG. 2 is a graph of stucco water reduction data for two oxidized lignosulfonates as compared to a known control product.

DESCRIPTION OF THE PREFERRED EMBODIMENT

The compositions of this invention are, basically nitric acid oxidized derivatives of the above described and identified lignosulfonates. Besides their unique chemical constitution, they are characterized in having a solubility—especially as regards saline solution divalent brine tolerance or compatibility—at least 10 percent and usually two to three or more times greater than that of the lignosulfonate starting material from which the nitric acid oxidized products of the present invention are derived; and a substantially increased, that is at least ten-fold in many cases up to thirty to fifty times, surfactant and dispersant activity. Thus, the compositions of the invention are characterized further in being essentially or substantially completely soluble in aqueous saline solutions containing relatively large concentrations of sodium chloride with divalent ions such as calcium and magnesium and aqueous sulfuric acid solutions at pH ranges below zero and, therefore, in concentrated acid solutions.

The nitric acid oxidized compositions are readily obtained by direct oxidation in strongly nitric acid media of the above referenced lignosulfonate starting materials.

A highly advantageous procedure for conducting the considerably exothermic reactions which are encountered is to start with the aqueous acid heel at about room temperature before commencing the spent sulfite liquor feed, even if this involves pre-cooling of the acid mass; then to add the spent sulfite liquor containing lignosulfonate to commence the exothermic reaction with subsequent refrigeration or cooling being employed to maintain the reaction mass without overheating runaway at or within the desired range of temperature. Therefore, nitric acid is charged to an acid resistant agitated reactor and cooled to room temperature or below. It is preferred that the Lignosulfonate is added to the nitric acid, and not vice versa, with good agitation in order to be able to adequately control cooling of the reaction. The oxidation reduction reaction is exothermic and sufficient cooling combined with lignosulfonate addition rate regulation is required to hold a relatively low temperature and defoamer is added as required to control foam generation. Generation of off-gases ($CO_2$, $NO_2$, etc.) requires caustic scrubbing. After lignosulfonate is added, the reaction continues exothermic and is cooled to hold a lower temperature for a suitable period of time. Cooling is then cut and the reaction allowed to exothermically heat to a higher temperature where the reaction is completed. It is advantageous in some cases to aerate the final reaction mass to purge all gases from the system. The reaction mass is neutralized with any alkaline system desired, such as NaOH, $Ca(OH)_2$, $MnO_2$, $NH_4OH$, LiOH, etc., to a final pH of four or higher. Sludge generated in the reaction is filtered or settled and the resulting clear solution can be evaporated if necessary, stored for liquid shipment or spray dried.

Temperature limits must be controlled at all costs. Although very manageable with cooling and lignosulfonate addition control, the exotherm if allowed to develop to critical temperature without cooling becomes extremely rapid with boiling temperature reached in a very short time. Foam-over and pressure build-up of evolved gases will occur. Adequate cooling and lignosulfonate rate addition are mandatory.

Evolved gases are primarily NOx and $CO_2$. Adequate scrubber systems are provided to eliminate these gases from the environment.

Indicative of the foregoing is the typical reaction experience wherein, for example, 100 grams of lignosulfonate (SSL) is treated for oxidation with 55 grams of nitric acid. This usually results in the realization of approximately 125 grams of reacted lignosulfonate (SSL) in the total solids obtained. This quantity will embody approximately 15 grams of calcium oxalate, calcium sulfate sludge.

Only five percent or so of the nitrogen contained in the nitric acid remains as an integral part of the final product. Lower oxidation states of nitric acid are evolved as NOx gases and scrubbed for environmental removal and discarded. At least one oxygen of the nitric acid is utilized by the spent sulfite liquor components during oxidation. While it is not intended to be bound by any particular theory, it is believed that the nitric acid oxidation of spent sulfite liquor components would proceed in an oxidation reduction reaction. Possible reduction sequence of nitric acid is shown in the following schematic (may not go to completion):

$$2NO_3 + 4H^+ + 2e \rightleftharpoons N_2O_4 + H_2O$$

$$N_2O_4 + H^+ + 2e \rightleftharpoons 2HNO_2$$

$$HNO_2 + H^+ + e \rightleftharpoons NO + H_2O$$

$$2NO + 2H^+ + 2e \rightleftharpoons H_2N_2O_2$$

$$H_2N_2O_2 + 2H^+ + 2e \rightleftharpoons N_2 + 2H_2O$$

Lignosulfonate Reactions:
Lignin—$CH_2OH \rightarrow$ Lignin COOH (not limited)
Some desulfonation, demethoxylation and polymer splitting occurs.
Carbohydrate reaction to oxalic acid + carbon dioxide + $H_2O$ As usually available, commercial lignosulfonates generally have the following typical analysis and physical characteristic features:

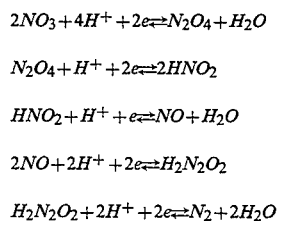

| | Norlig A | Lignosol BD | Marasperse N-22 |
|---|---|---|---|
| | Typical Analysis (moisture-free and weight percent basis) | | |
| pH, 3% solution | 3.0 | 4.3 | 8.0 |

|  | Norlig A | Lignosol BD | Marasperse N-22 |
|---|---|---|---|
| % Sodium | 0.1 | <0.1 | 6.7 |
| % Calcium | 4.0 | 4.0 | 0.6 |
| % Sulfate Sulfur | 0.5 | 0.4 | 0.8 |
| % Non-Sulfonate Sulfur | 0.6 | 0.5 | 0.9 |
| % Sulfonate Sulfur | 5.0 | 5.3 | 5.7 |
| % Total Sulfur | 5.6 | 5.8 | 6.5 |
| % Methoxyl | 8.9 | 7.5 | 8.1 |
| % Reducing Sugars | 15.7 | 20.0 | 0.8 |
| Physical Characteristics | | | |
| Usual Form | Powder | Powder | Powder |
| Moisture Content (max. % $H_2O$) | 5.0 | 7.0 | 6.0 |
| Color | Brown | Yellow | Brown |
| Bulk Density (lbs./cu. ft.) | 36 | 40 | 43 |
| Solubility in Water, % | 100% | 100% | 100% |
| Solubility in Oils & Most Organic Solvents % | 0 | 0 | 0 |

The other essential reactant in the process of the present invention, namely nitric acid, may be employed in any of the commercially available concentrations, such as fuming nitric acid, concentrated nitric acid, or diluted nitric acid with the preferred concentration being about 68% to 70%.

In another embodiment of this invention the oxidized sulfonated lignin material may be combined with a compound containing an acid-soluble polyvalent metal cation, whereby the resulting salt of oxidized sulfonated lignin material will contain the cation incorporated into the reaction mixture.

The acid-soluble polyvalent metal cation which may be employed for preparing polyvalent metal salts of oxidized lignosulfonates may include various salts of nickel, chromium, iron, copper, aluminum, cobalt, magnesium, zinc, cadmium, titanium, bismuth, etc. It should be noted that when a chromium salt is employed, chromium is present in the form of a cation, as for example in chromium sulfate, nitrate or chloride.

It is also within the scope of this invention to employ oxides or hydroxides of the above-mentioned polyvalent metals, provided that such hydroxides or oxides are capable of forming an acid-soluble salt.

In preparing the products of this invention, it is preferred to first oxidize the sulfonated lignin material and thereafter treat it with a polyvalent metal cation.

The resulting liquid oxidized lignosulfonate material may be spray-dried in a conventional spray-drying equipment to produce a free-flowing powdered product.

Although the concentration and the relative proportions of the reactants of the present invention may vary within a wide range, the practical applications have indicated that the sulfonated lignin material should be employed in the form of an aqueous solution containing from about 10% to 60% solids by weight with the preferred range being 55% to 58% solids by weight.

The amount of nitric acid (100% basis) employed for the oxidation of sulfonated lignin may range from 35% to 100% by weight of dry solids of the sulfonated lignin, preferably between 45% and 60% of nitric acid. These amounts may apply regardless whether nitric acid is used in its fuming, concentrated or dilute form.

When a polyvalent metal cation is employed as one of the reactants in the present invention, the polyvalent metal salt should be incorporated in such an amount as to supply from about 0.5% to 50% of the metal, by weight, based on the dry sulfonated lignin and preferably from 1% to 15% of the metal by weight.

The temperature of the oxidation reaction may vary, in general, between room temperature, i.e. about 20° C., and the boiling point of the reaction mixture, i.e. about 100° C. However, the preferred temperature range is between 30° C. and 40° C.

The time of the reaction may vary depending on the amount of the oxidizing agent employed, its concentration, the reaction temperature and the desired properties of the reaction product. In general, the reaction is allowed to proceed until the sulfonated lignin is oxidized without being degraded to avoid substantially its conversion to nitrolignins, simple organic acids and carbon dioxide. The oxidation period of time may be as low as about 5 minutes and as long as 2 hours or even longer.

The pH of the finished reaction medium is very low. In most of the cases, its value will be below 1. If it is desired to raise the pH of the resulting liquid reaction product, a polyvalent metal salt of a weak acid, such as carbonic, boric, silicic, etc., or metal oxides or hydroxides soluble in acidic solutions may be added. Thus neutralization of the final reaction batch may be carried out with any alkaline medium depending upon the final use of the product. Preferably, ammonium hydroxide, sodium hydroxide, manganese dioxide or calcium oxide is used.

EXEMPLIFICATION OF THE INVENTION

The following detailed illustrations more particularly delineate and show the extraordinary benefits and advantages of the present invention and illustrate the exceptionally useful and versatile nitric acid oxidized composition products obtained thereby.

EXAMPLE ONE

Following a mathematical treatise of oxidation reduction half reaction with the respective oxidation reduction potentials (EoEr) and equilibrium constants (KoKr) a statistical series of nitric acid oxidation experiments were carried out on Norlig A and on oxidized products 0138-60 to 0138-64 made in accordance with the above described procedures. Reaction conditions and results are shown in Table 1 statistical reaction series. A typical reaction would be 0138-62(3) where 179.3 grams of spent sulfite liquor Norlig A having 52% solids were reacted with 100 grams of nitric acid as 71 percent aqueous solution. The reaction was carried out by cooling the nitric acid in an agitated heel and adding the spent sulfite liquor product Norlig A to the heel over a period of time holding the reaction temperature below 40° with cooling. A 49.6 percent solids solution was recovered containing 225.2 grams of solids having a viscosity of 54 centipose. This recovered reaction mass contained 12.4 percent sludge on solids. After filtering, the solids recovery was 64.7 percent based on total solids charged and 110.0 percent based on spent sulfite liquor solids charged. All of the statistical series of products were evaluated as dispersants on ASP-700 Stellar Clay, Setan Lime Base Drilling Clay System and for solubility tolerance in calcium-magnesium containing strong brine. Results are shown in Tables 2, 3, 4 and FIG. 1. These results show a good response surface and optimum nitric acid oxidation conditions were low temperature, high acid concentration and high spent sulfite liquor concentration (0138-62-3). In all three evaluations, the optimum product out-performed all products tested indicating excellent universal surface active performance.

Table 2 illustrates the evaluation of oxidized samples 0138-60 to 0138-64 as dispersants in clay. In such systems, low yield points are desirable. Therefore, as shown, samples 138-60, 138-62 and 138-64 clearly outperformed standard Marasperse N22 control as well as samples 138-61, 138-63 and Norlig A. Note particularly the poor yield points of samples 138-61 and 138-63 which are samples oxidized with 33.5% by weight nitric acid on lignin dry solids, i.e., an amount greater than that disclosed and claimed in Hoyt U.S. Pat. No. 3,070,591. Thus, a product oxidized with 33.5% acid on lignin solids is insufficient to provide an appropriate dispersant in clay systems.

Table 3 illustrates the evaluation of the same oxidized samples as dispersants in Setan lime base mud. In such systems, low gel points are desirable. Therefore, as shown, all the oxidized samples clearly outperformed Setan control, Marasperse N22 and Norlig A with sample 138-62 having optimum performance characteristics of the samples tested.

Table 4 illustrates the evaluation of the same samples for their solubility tolerance in calcium-magnesium containing strong brine. As shown, sample 138-62 clearly out-performed all other products tested because it essentially remained in solution up to 180 g/l. The data in Table 4 is also plotted and graphed in FIG. 1 which shows sample 138-62 remains effective even at 180 g/l.

TABLE 1

Statistical Reaction Series

| | Reaction Conditions | | | Total Rec. Soln. | | | | Yield | | | |
|---|---|---|---|---|---|---|---|---|---|---|---|
| | | | | | g. Solids | Visc. | % on Solids | % Rec. on Solids | | on Total Solids | |
| Exp. | SSL | HNO$_3$ | Temp. °C. | % | Rec. | cps | Sludge | NaOH | (Na) | As Is | Sludge |
| 0138-60 (1) | 179.3 (52%) | 80 (44.6%) | 60 | 50.0 | 216.5 | 52 | 7.8 | 8.8 | (5.0) | 77.8 | 71.7 |
| 0138-61 (2) | 179.3 (52%) | 60 (33.5%) | 40 | 51.6 | 220.3 | 110 | 4.5 | 9.1 | (5.3) | 84.9 | 81.1 |
| 0138-62 (3) | 179.3 (52%) | 100 (55.8%) | 40 | 49.6 | 225.2 | 54 | 12.4 | 11.5 | (6.6) | 73.8 | 64.7 |
| 0138-63 (4) | 179.3 (52%) | 60 (33.5%) | 80 | 50.4 | 210.2 | 82 | 5.6 | 6.0 | (3.5) | 83.4 | 79.1 |
| 0138-64 (5) | 179.3 (52%) | 100 (55.8%) | 80 | 46.4 | 211.1 | 46 | 11.3 | 9.2 | (5.3) | 70.6 | 62.6 |
| Norlig A 12U4 | | | | 50.0 | | 380 | | | | | |

TABLE 2

Clay Conditioner Evaluation Summary (ASP-200 Stellar Clay System)

| Sample ASP-200 175-47-2 Dispersant = 0.17% | PRODUCT EVALUATION | | | | | |
|---|---|---|---|---|---|---|
| | Fann Readings | | | | | |
| | 600° Initial | 300° Initial | 3° Initial | Apparent Viscosity (cps) | Plastic Viscosity | Yield Point (lbs./100 sq. f |
| Marasperse N-22 GN11U-27s3 Control | 56 | 48 | 37 | 28 | 8 | 40 |
| 138-60 (1) | 41 | 34 | 25 | 21 | 7 | 27 |
| 138-61 (2) | 59 | 51 | 40 | 30 | 8 | 43 |
| 138-62 (3) | 38 | 30 | 20 | 19 | 8 | 22 |
| 138-63 (4) | 90 | 80 | 60 | 45 | 10 | 70 |
| 138-64 (5) | 45 | 37 | 29 | 23 | 8 | 29 |
| 138-60 R.M. Norlig A | 294 | 273 | 125 | 147 | 21 | 252 |

Oxidized product 0138-62 (3) at 19 cps viscosity and 22 lbs./100 sq. ft. yield point out-performed standard Marasperse N-22 control.

TABLE 3

Setac Lime Base Mud

| Dispersant | Fann° | | | | | Apparent Viscosity | Plastic Viscosity | Yield Point |
|---|---|---|---|---|---|---|---|---|
| | 600 | 300 | 3 | 0' Gel | 10' Gel | | | |
| Setan Control 3/1/89 (Norlig 412) | 29 | 20 | 4 | 7 | 24 | 15 | 9 | 11 |
| Msp. N-22 | 83 | 71 | 21 | 16 | 25 | 42 | 12 | 59 |
| Norlig A | 72 | 47 | 1 | 1 | 3 | 36 | 25 | 22 |
| 0138-60 (1) 17.39 g | 17 | 8 | 0 | 0 | 0 | 9 | 9 | −1 |
| 0138-61 (2) 16.19 g | 18 | 9 | 0 | 0 | 0 | 9 | 9 | 0 |
| 0138-62 (3) 18.52 g | 16 | 8 | 0 | 0 | 0 | 8 | 8 | 0 |
| 0138-63 (4) 17.09 g | 35 | 18 | 0 | 0 | 1 | 18 | 17 | 1 |
| 0138-64 (5) 18.18 g | 19 | 10 | 0 | 0 | 0 | 10 | 9 | 1 |

Oxidized product 0138-62 (3) had optimum performance at 8 cps viscosity and 0 lbs./100 sq. ft. yield point, considerably better than Setan control.

TABLE 4

| | Salt Tolerance Test - Diluted 220 g/l Brine | | | | | | | | | |
|---|---|---|---|---|---|---|---|---|---|---|
| Product | g/l | % Sludge | g/l | % Sludge | g/l | % Sludge | g/l | % Sludge | g/l | % Sludge |
| 0138-60 RM | 50 | trace | 60 | trace | 70 | 0.3 | 80 | 0.8 | | |
| 0138-60 (1) | 100 | 0.2 | 110 | 0.4 | 120 | 0.6 | | | | |
| 0138-61 (2) | 80 | 0.3 | 100 | 0.5 | 120 | 0.8 | | | | |
| 0138-62 (3) | 120 | 0.05 | 130 | 0.06 | 140 | 0.08 | 160 | 0.2 | 180 | 0.3 |
| 0138-63 (4) | 80 | 0.1 | 100 | 0.7 | 120 | 1.0 | | | | |
| 0138-64 (5) | 100 | 0.2 | 110 | 0.5 | 120 | 0.6 | | | | |
| Msp. N-3 | 120 | 0.02 | 140 | 0.02 | 160 | 0.02 | 180 | 2.0 | | |
| Msp. N-22 | 120 | 0.02 | 130 | 2.0 | 140 | 2.0 | | | | |

EXAMPLE TWO

A second sample of Norlig A was oxidized with 50 percent nitric acid on spent sulfite liquor solids following the procedure of the first example. This product was then neutralized with manganese dioxide after the oxidation reaction and designated 0138-67-1. This neutralization followed by filtration formed a chrome-free drilling mud conditioner that was evaluated in Panther Creek Drilling Clay System. In such systems low yield points and low gel strength is desirable. Results are shown in Table 5 and show that the manganese salt of nitric acid oxidized Norlig A was equal to Petrolig chrome-free control which is a manganese dioxide oxidized lignosulfonate product available from Daishowa Chemicals, Inc. It was better than Marasperse N-22 or the Setan oil well drilling chrome-free calcium base clay conditioner which is an ozone oxidized lignosulfonate product and better in gel strength than a chrome product control, Marasperse CR-23-6.

TABLE 5

| | Panther Creek Calcium Montmorillonite Drilling Clay Evaluation | | | | | | |
|---|---|---|---|---|---|---|---|
| | Fann Viscometer Rheology | | | Apparent | Plastic | Yield | 10' |
| Product | 600° | 300° | 3° | Viscosity | Viscosity | Point | Gel |
| Msp. CR-23-6 Chrome Control (3987-85) | 48 | 31 | 10 | 24 | 17 | 14 | 53 |
| Petrolig Chrome-Free Control (12P18s-3) | 56 | 42 | 23 | 28 | 14 | 28 | 47 |
| Msp. N-22 Control | 89 | 76 | 47 | 45 | 13 | 63 | 51 |
| Setan Control (Norlig 412) | 102 | 86 | 45 | 51 | 16 | 70 | 34 |
| Nitric Acid Oxidized Norlig A Mn Salt (0138-67-1) | 57 | 43 | 24 | 29 | 14 | 29 | 30 |

EXAMPLE THREE

A softwood sample identified as Lignosol B was treated with 50 percent nitric acid following the procedure of the first example. This product was evaluated in phosphate wet rock dispersion and screening, and chelation—trace metal chelates. Results are shown in Tables 6, 7 and 8.

TABLE 6

| | Phosphate Wet Rock Dispersion | | | |
|---|---|---|---|---|
| | % on | Phosphate Rock | Brookfield Viscosity | |
| Dispersant Type | Solids | Solids, % | 20 rpm | 10 rpm |
| None | 0 | 70.0 | 3,500 | 5,600 |
| " | 0 | 68.0 | 2,200 | 4,000 |
| " | 0 | 66.0 | 1,450 | 2,600 |
| Norlig A | 0.5 | 70.0 | 5,100 | 7,000 |
| Lignosol B | 0.5 | " | 5,200 | 7,600 |
| Norlig 412 | 0.5 | " | 3,300 | 5,400 |
| Marasperse N-3 | 0.4 | " | 2,000 | 3,800 |
| " | 0.5 | " | 1,800 | 3,400 |
| " | 0.6 | " | 1,600 | 3,100 |
| " | 0.7 | " | 1,450 | 2,700 |
| Petrolig ERA-29 | 0.5 | " | 2,800 | 4,900 |
| 138-62-3 HNO₃ Hwd. | 0.5 | " | 1,600 | 3,000 |
| " | 0.6 | " | 1,450 | 2,700 |
| 136-66 HNO₃ Swd. | 0.4 | " | 1,600 | 3,000 |
| " | 0.5 | " | 1,400 | 2,600 |

TABLE 7

| Phosphate Rock Slurry R-219-1 Screen Test - Through #20 Mesh | | | | |
|---|---|---|---|---|
| Dispersant | % on | Solids | Solids, % | % Through | Change |
| Type | | | | | |
| Blank | — | 70.0 | 66.8 | |
| " | — | 68.0 | 76.5 | 9.7 |
| Marasperse N-3 | 0.5 | 70.0 | 76.6 | 4.8 |
| | 1.0 | " | 75.9 | 9.1 |
| Norlig A HNO₃ Oxidized (138-62-3) | 0.5 | " | 67.2 | 0.4 |
| | 1.0 | " | 73.4 | 6.6 |
| | 1.5 | " | 78.9 | 12.2 |
| Lignosol B HNO₃ Oxidized (138-66) | 0.5 | " | 71.1 | 4.3 |
| | 1.0 | " | 76.3 | 9.5 |
| | 1.5 | " | 78.3 | 11.5 |

TABLE 8

| | DeLaval Centrifuge, Volume % Sludge | |
|---|---|---|
| Product | 1 Hour | 24-Hours |
| Marasperse N-3 Control | 0.40 | 0.25 |
| Kelig FS Control | 0.00 | 0.00 |
| Norlig A Control | 3.5 | not run |
| Lignosol B Control | 3.5 | not run |

TABLE 8-continued

| Product | DeLaval Centrifuge, Volume % Sludge | |
|---|---|---|
| | 1 Hour | 24-Hours |
| Nitric Acid Oxidized 0138-62-3 Hwd. | 0.07 | 0.11 |
| Nitric Acid Oxidized 0138-66 Swd. | 0.02 | 0.00 |

In the phosphate wet rock dispersion-test (Table 6), low Brookfield viscosity is desirable. The Lignosol nitric acid oxidized softwood product, 138-66, was the best cost performance product tested with the hardwood nitric acid oxidized product, 138-62-3, also a good performer. Note also that at higher % solids (70%) the nitric acid oxidized product provides the same or lower viscosity as regular production rock provides at more dilute concentrations (i.e. 66%).

In the phosphate rock screening Test (Table 7) high screen efficiency is desirable. As shown the Lignosol oxidized product (138-66) is the best performer.

In the chelation trace metal chelates test (Table 8), the nitric acid oxidized product performed better on a cost/performance basis than Kelig FS control, which is a commonly available lignosulfonate based chelate for micronutrient foliar sprays available from Daishowa Chemicals Inc.

EXAMPLE FOUR

A sample of Marasperse raw material (B-41 Norlig A), a sugar destroyed raw material, was treated with nitric acid (40 percent) following the procedure of the first example. This product was referred to as 0138-71. This product and the 0138-62-3 products were evaluated in a stucco water reduction system. In such systems the highest water reduction possible is desirable. Both products performed well. The 0138-62-3 whole liquor product performed exceptionally well on a cost performance basis. Results are shown in Table 9 and FIG. 2.

TABLE 9

| DISPERSANT EVALUATION OF TEMPLE INLAND STUCCO -- FLETCHER, OK | | | | |
|---|---|---|---|---|
| Dispersant | Dosage (%) | WSR | % Water Reduction | Set Time (min) |
| Blank | 0 | 90.0 | 0 | 10.5 |
| Marasperse GNS | 0.1 | 85.0 | 5.6 | 11.0 |
| | 0.2 | 81.0 | 10.0 | 10.0 |
| | 0.3 | 79.0 | 12.2 | 9.5 |
| RD-0138-62 | 0.1 | 80.0 | 11.1 | 10.0 |
| | 0.2 | 75.0 | 16.7 | 11.0 |
| | 0.3 | 73.0 | 18.9 | 14.0 |
| RD-0138-71 | 0.1 | 80.0 | 11.1 | 10.0 |
| | 0.2 | 75.0 | 16.7 | 11.0 |
| | 0.3 | 72.5 | 19.4 | 13.5 |

The intrinsic excellent properties and frequent superiority of products made in accordance with the present invention are easily discernible and plainly evident from the foregoing exemplifications and illustrations. The nitric acid oxidized lignosulfonate products obtained by present practice are all found to be extremely useful and effective as improved salt tolerant dispersant agents for kaolin and montmorillonite clays, phosphate wet rock, stucco calcium sulfate, and useful as trace metal chelates. They have also been shown to be improved dispersing agents for dyestuffs, pesticides, ceramic refractory preparations, as well as for emulsification of oils in various petroleum products, and additionally in many instances a valuable and highly efficacious retarding agents for oil well cement compositions to control and regulate the setting thereof under high temperature and pressure conditions, even in high saline aqueous environments.

Many changes and modifications can readily be made and adapted in embodiments in accordance with the present invention without substantially departing from its apparent and intended spirit and scope, as it is set forth and defined in the hereto appended claims.

I claim:

1. A process for producing an oxidized lignosulfonate composition consisting essentially of admixing a lignosulfonate and nitric acid to form a reaction mixture by initially providing a source of nitric acid, thereafter adding the lignosulfonate to the nitric acid such that the amount of acid comprises from about 35% to about 100% by weight of dry solids of the lignosulfonate and thereafter reacting said mixture for a time sufficient to form the oxidized lignosulfonate composition.

2. The process of claim 1 wherein said acid comprises from about 45% to about 60% by weight of dry solids of the lignosulfonate.

3. The process of claim 1 wherein said reaction takes place at a temperature of between about 20° C. and about 90° C.

4. The process of claim 1 wherein said reaction takes place at a temperature of between about 30° C. to about 40° C.

5. The process of claim 1 wherein said lignosulfonate is sulfite lignin.

6. The process of claim 1 wherein said lignosulfonate is obtained from softwood.

7. The process of claim 1 wherein said lignosulfonate is obtained from hardwood.

8. The process of claim 1 wherein said lignosulfonate is sulfonated lignin.

9. The process of claim 1 wherein said lignosulfonate is obtained from spent sulfite liquor.

10. The process of claim 9 wherein the spent sulfite liquor has a solids concentration of from about 10% to about 60% by weight.

11. The process of claim 9 wherein the spent sulfite liquor has a solids concentration of from about 55% to about 58% by weight.

12. The process of claim 1 further including the step of neutralizing the oxidized lignosulfonate composition with a compound selected from the group consisting of ammonium hydroxide, sodium hydroxide, manganese dioxide and calcium oxide.

13. The process of claim 1 further including the step of reacting the oxidized lignosulfonate composition with a compound containing an acid-soluble polyvalent cation in an amount of from about 0.5% to about 15% of the cation by weight of dry solids of lignosulfonate to form a salt of said oxidized lignosulfonate.

14. The process of claim 13 wherein said cation is selected from the group consisting of metal salts of nickel, chromium, iron, copper, aluminum, cobalt, magnesium, zinc, cadmium, titanium and biomutle.

15. The process of claim 14 further including the step of neutralizing the oxidized lignosulfonate composition with a compound selected from the group consisting of ammonium hydroxide, sodium hydroxide, manganese dioxide and calcium oxide.

* * * * *